March 22, 1966     R. W. PIERCE     3,241,298
METHOD FOR MAKING A FINE POROSITY FILTER ELEMENT
Filed Nov. 26, 1962
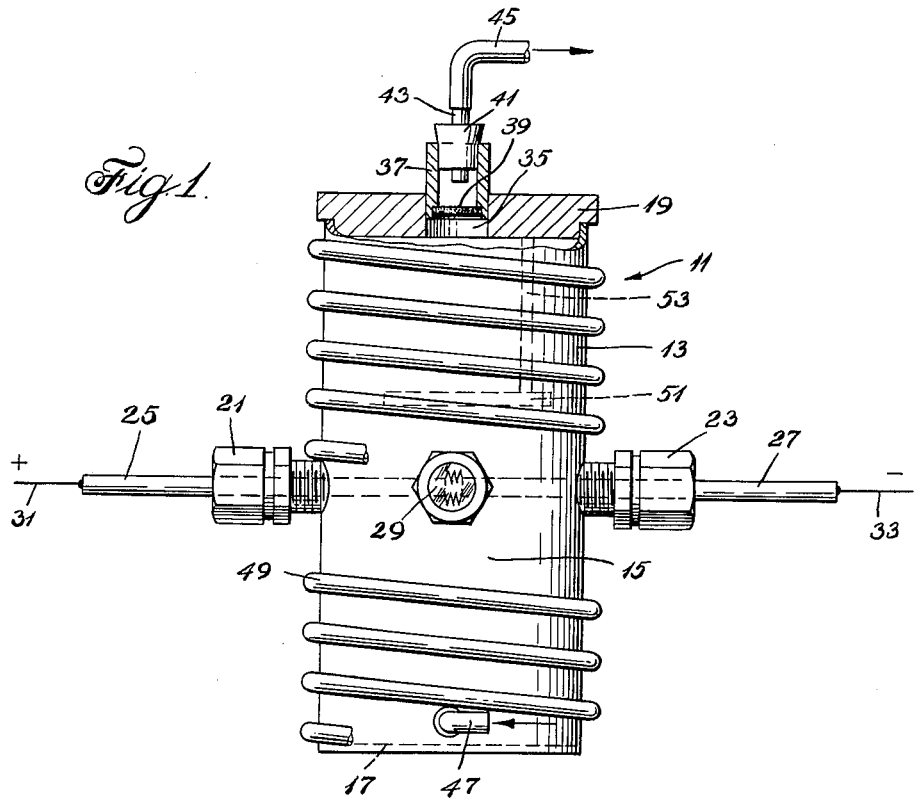
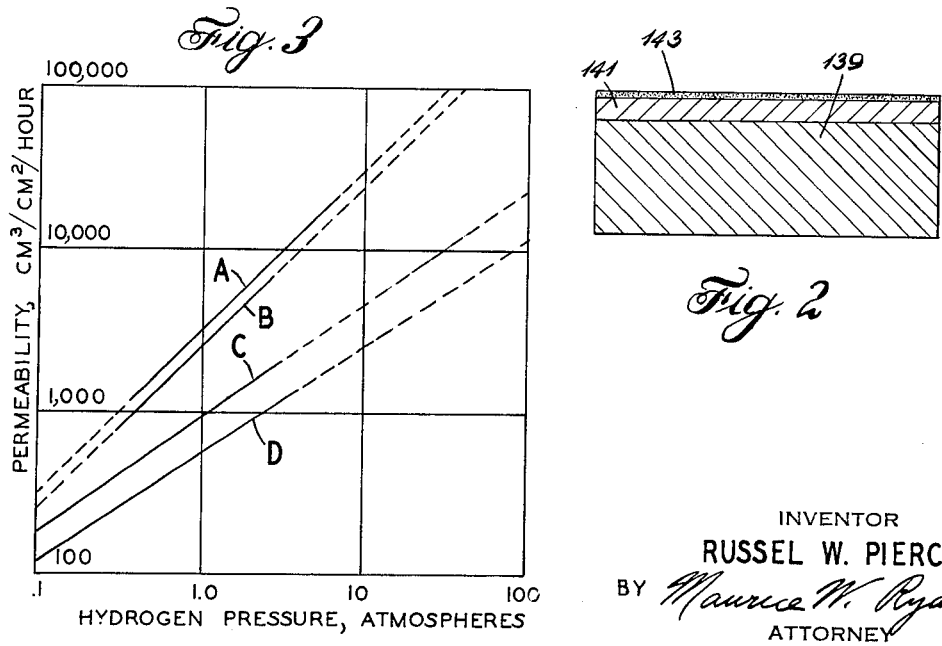
INVENTOR
RUSSEL W. PIERCE
BY *Maurice W. Ryan*
ATTORNEY United States Patent Office 3,241,298
Patented Mar. 22, 1966

3,241,298
METHOD FOR MAKING A FINE POROSITY
FILTER ELEMENT
Russell W. Pierce, Charleston, W. Va., assignor to Union
Carbide Corporation, a corporation of New York
Filed Nov. 26, 1962, Ser. No. 239,910
1 Claim. (Cl. 55—524)

The present invention relates to improved microporous filters and to a method for fabricating such filters and more particularly to a method for making microporous filters which are uniquely suitable for use as supporting substrate elements in gas separation or diffusion barriers made in accordance with the invention disclosed in my copending application Serial No. 184,159, filed April 2, 1962.

Many filtering processes in industry require filtering elements having extraordinarily fine porosity, it being the desideratum in some instances to approach as closely as possible porosities of monomolecular dimension. In the gas purification techniques which comprehend separating a selected component gas out of a multicomponent gas mixture by directing a stream of the mixture against a barrier which is permeable to the selected component gas but impermeable to other components of the mixture and collecting the selected component gas downstream of the barrier, the barriers used comprise an extremely thin selectably permeable foil or film supported on a porous substrate. The techniques for gas purification according to this diffusion concept and novel methods for applying film portions of the barriers to substrates are discussed in my copending application Serial No. 184,159, filed April 2, 1962 and entitled, "Metal Films for Purifying Gases." In a specific application of the gas permeation concept, it has been found that hydrogen of very high purity can be obtained by the selective diffusion method, using palladium foil or film coated barriers. Similarly, it is known that silver is permeable to oxygen and nickel to carbon monoxide. Use of the method of selective diffusion of hydrogen through hydrogen-permeable palladium coated barriers on a commercial scale would be highly desirable if some of the difficulties attending the use of the barrier structures could be overcome. Since the rate of diffusion of the selected component gases through the respective coatings permeable to them is inversely proportional to the thickness of the coating material, ultra-thin foils or otherwise applied coatings provide for higher throughput or diffusion rates and permit utilization of relatively low flow-sustaining pressure differentials across the barriers. A two-fold economic advantage, sc., coating cost reduction and stream compression cost reduction, also accrues in the use of ultra-thin foils. Additionally, in the case of materials which are in relatively short supply, such as palladium for hydrogen purification, there accrues the advantage of higher total production with a given amount of the diffusion membrane material. The most salient difficulty encountered in the use of extremely thin barrier foils or coatings, however, is in respect of available substrate materials and structures to support the thin coatings. Ideally, substrates for the support of extraordinarily thin permeable coatings, however applied, should have extremely smooth facia surfaces in which multitudinous microscopic pores obtain. In unmagnified appearance, these facia surfaces should be mirror-like, with no projections extending outward from a common facia plane. This permeable membranes overlaid on such substrates will be evenly supported at myriad areas with other myriad areas spanning the micropores. Surface characteristics and pore sizes of presently available substrate materials are such that coatings applied as thin sheets of foils to the substrates undergo myriad point rupture-inducing stresses under the pressure differentials used, causing barrier failure and consequent loss by contamination of product gas. Where barriers are made according to the substrate coating technique of my above-noted copending application, the use of substrates having other than extremely fine porosity and smooth facia surface characteristics will result in diffusion barriers having facia pockets which can fill with substances other than the selected gas to be permeated and thereby attenuate the barrier surface available for dissociation activity of the selected gas and cause throughput reduction. In this connection, it should be noted here, that while definite advantages accrue in using filters according to the present invention as substrate components in foil coated barriers, far greater advantages accrue in using these novel filters as substrate components in barriers filmed with selectably permeable metals according to my said copending application. This is so because foil-layered barriers are still subject to the limitations respecting foil thickness imposed by the metal working art. In fact, practical foil thicknesses for permeation barriers are generally in the order of 1 mil, whereas the filmed or vapor plated membranes can be practically applied in thicknesses in the order of 1000 Angstrom units to 6 microns to the barrier substrates. Where, as in the filter substrates according to the present invention, pore sizes on the face of the substrates are in the order of 50 to 300 Angstroms, the substrate facia pores are readily bridged without the occurrence of "pinholes" or "plugs" in the barrier's active surface.

Accordingly, it is an object of the present invention to provide an extremely fine porosity smooth surfaced filter which is uniquely suitable for use as a supporting substrate in vapor-filmed gas permeation barriers.

It is a further object of the present invention to provide an extremely fine porosity smooth surfaced filter which can be used with great advantage as a supporting substrate in foil-coated gas permeation barriers.

It is a still further object of this invention to provide an extremely fine porosity filter.

It is also an object of this invention to provide a method for making filters and gas permeation barrier substrates of extremely fine porosity and smooth surface characteristics.

In general the method for fabricating filters and substrates according to the present invention comprehends overlaying a relatively grossly porous metal surface in sheet, tubular or other shaped form with a layer of microscopically small solid metallic particles. These particles are preferably prepared from a malleable metal. The coated metal base piece is then heated to effect sintering of the coating particles and then pressed by or against a smooth hardened surface with a compressive force sufficient to compact the sintered coating particles to the desired porosity and surface smoothness and to effect cohesion between the coating material particles and the base piece. The coating, sintering and compressing steps may, in some instances, have to be repeated one or more times to obtain a satisfactorily filled and smoothed substrate or filter. The filter or substrate made according to this method thus comprises a porous metallic base portion in combination with a coating on at least one surface thereof which coating is sintered and pressed onto said base portion to a degree necessary to effect the coating surface porosity and smoothness desired.

The improved filters and gas permeation barrier substrates according to the present invention can be fabricated from common commercially available materials. Porous iron and stainless steel as base materials and electric arc-sputtered nickel particles have been used in combination successfully in one mode of practicing the invention.

With the foregoing features in view and others which will hereinafter more fully appear, the invention will now be described in greater detail and with respect to the appended drawings wherein:

FIGURE 1 is a partially sectional elevational view of an electric arc nickel smoke plating apparatus used to coat base pieces in accordance with the present invention;

FIGURE 2 is a cross sectional view of a gas diffusion barrier which includes a supporting substrate according to the present invention and FIGURE 3 is a graph on Cartesian coordinates illustrating the relative permeability of hydrogen gas diffusion barriers made according to the vapor plating technique and utilizing palladium film supporting substrates according to this invention and gas diffusion barriers comprising rolled palladium foils on conventional supporting substrates.

Referring to FIGURE 1, a coating apparatus indicated generally as 11, comprises a hollow cylindrical body 13 enclosing an arcing chamber 15. A closure plate 17 is provided to close the lower end of the arcing chamber 15 and the chamber upper end is closed with a cover plate 19. About midway on the height of body 13 a pair of electrode holders 21 and 23 are screwed into or otherwise affixed to the body in opposed diametrical relationship, each with respect to the other. Electrodes 25, 27 comprising the material with which a filter or substrate base piece is to be coated are inserted respectively into the electrode holders 25 and 27 and adjusted to form a desired electrode arc gap centrally within the chamber 15. A viewing window 29 is provided in the body 13 cylindrical wall to permit observation of the arc during operation of the apparatus. When adjusted to the desired gap, the electrodes are secured by tightening the nuts of the electrode holders in the conventional manner. Electrical conductors 31, 33 are connected respectively to the electrodes 25, 27 and in turn connect to an external current source not shown.

The cover plate 19 is provided with a centrally located opening 35 into which is fitted and secured a base piece holding collet 37. A base piece 39 to be coated with sputtered electrode particles is mounted in the lower end of the collet 37 by any suitable conventional means such as a press fit, a holding ring or the like. The upper end of collet 37 is provided with a sealing plug 41, through which projects a vacuum conduit 43. A conduit 45 connects the conduit 43 to a vacuum source such as an aspirator or pump, not shown. At the lower end of arcing chamber 15, an inlet 47 is provided in the cylindrical body 13 wall for connection of a gas pressure line.

A cooling coil 49 is arranged spirally around the body of the apparatus and is provided with suitable connections for the continuous passage of a coolant such as circulating water, therethrough. There may also be provided an arc baffle 51 positioned in chamber 15 to extend over the arc developed between the electrodes in order to diffuse the sputtered particles of electrode material and prevent agglomerations thereof on the base piece 39 during the coating operation. In the illustrated apparatus, the baffle 51 is supported by a bracket 53 secured to and projecting downward from the underside of the cover plate 19.

In operation, the base piece 39 to be coated is secured in the holding collet 37, assembled as shown in the drawing with the cover plate 19, cylindrical body 13, sealing plug 41, vacuum conduits 43 and 45 and with the arc baffle 51 on bracket 53 disposed interior of chamber 15 to extend over the arc. Electrodes 25 and 27 are adjusted to the desired gap and secured by means of the electrode holders 21, 23. A source of pressurized inert gas is connected to gas inlet 47. Cooling, vacuum and gas pressure systems are put into operation and the external circuitry connected to the electrodes is energized and adjusted to produce an arc. Electrode particles produced in the arc are directed to the base piece 39 by the combined flow developed with the vacuum system and the inert gas pressure system. The particles produced in the arc are extremely fine and have the appearance of smoke. Any undesirable large particles which may randomly occur in the arc will impinge on the baffle 51 and will not reach the base piece 39 being coated.

After a period of operation sufficient to deposit a preselected thickness of the coating particles on the base piece, the base piece is removed from the coating apparatus and sintered for a time and at a temperature appropriate to the electrode material used. After the sintering operation the surface of the sintered coating particles is compressed against a hardened smooth polished surface to compact the coating particles to finer porosity, smooth the surface and to effect cohesion between the coating particles and the base piece. As noted hereinabove, the coating, sintering and compressing operation may have to be repeated one or more times, in some instances, to obtain the desired surface smoothness porosity with particular selected materials.

As to the coating procedure, while marked success has been experienced in using the arc-sputtering technique described above, it is also possible to coat the base piece by electroplating or by merely spreading finely particalized coating substances on base pieces prior to sintering and compacting. The arc-sputtering or smoking technique, however, is preferred because of its advantages. Specifically, the arc-sputtered "smoke" of the material being deposited comprises a colloidal suspension of finely divided solid particles in the inert gas. These particles are discrete and rather widely dispersed in the suspension. When they impinge on the relatively grossly porous base piece, considerable travel into the base piece beyond its surface takes place before the first deposited particles come to rest. Consequently, as the depositing operation continues, roots or tendrils of the finely divided arc-sputtered material, which extend comparatively deep into the base piece, are formed. Upon sintering and compacting firmer than otherwise deposit attachment to the base piece is obtained through these roots or tendrils of deposited material. While a loose powder sprinkled on the base piece will also be forced into the base piece pores to some extent during the compacting procedure, the resulting bond between base and microporous face is demonstrably not as strong as with the smoking technique. Additionally, the desired smooth facia characteristic is more readily obtained on substrates made according to the arc-sputtering or smoke deposit method. The deposit particles, being discrete and extremely fine, tend to follow the inert gas flow. Gas flows most readily into and through portions of the base piece having the least flow resistance. Thus, using the arc-sputtered smoke technique combined with aspiration at the upstream side of the base piece tends to first fill the larger base piece pores with deposit and then the smaller pores, effecting what amounts to a self-levelling application of deposited material.

FIGURE 2 of the drawings is a cross sectional view through a gas diffusion barrier embodying a supporting substrate acording to the present invention and illustrates a base piece 139 surmounted by a sintered and compressed coating 141 filmed with a fine layer of metal 143 permeably specific to a preselected gas to be diffused through the barrier. In such a permeation barrier structure, the compacted coating provides a fine porosity smooth facia surface support for the ultrathin membrane or film 143 and the base piece 139 lends strength and rigidity to the composite structure.

FIGURE 3 of the drawings illustrates graphically the improved permeability characteristics of hydrogen-specific gas permeation barriers made according to my said copending application and utilizing fine porosity substrates according to the present invention. The graph ordinates are scaled in permeability in cubic centimeters of hydrogen passed through each square centimeter area of diffusion barrier surface per hour and the axis of abscissas of the graph of FIGURE 3 is scaled in atmospheres of pressure at the active face side of the barriers tested. The solid portions of the four curves shown in the graph of FIGURE 3 represent operating conditions for which curve data was recorded and the curve dotted portions are extrapolations.

Curve A represents the permeability characteristic of a hydrogen diffusion barrier consisting of a ½ mil film of palladium, vapor-plated onto a composite substrate fabricated according to the present invention. The substrate consisted of a $15/16$ inch diameter, $1/16$ inch thick grade "H" porous stainless steel filter stock base piece and a coating of nickel particles electric-arc sputtered or "smoked" onto the base piece until the nickel was deposited in an amount of about 0.03 gram per square centimeter of base piece coated area. This coating was sintered in one atmosphere of hydrogen at a temperature of about 800° C. for slightly less than one minute and then pressed against a hardened polished tool steel surface with a force of 10 tons per square inch. Permeation tests on this barrier were conducted at a temperature of 225° C. and pressure was varied to produce the data from which curve A of FIGURE 3 was drawn.

Curve B represents the permeability characteristic of a hydrogen diffusion barrier consisting of a 6 micron film of palladium, vapor-plated onto a substrate similar to and made in the same manner as that described above respecting curve A. Permeation tests on this barrier were conducted at a temperature of 215° C. and pressure was varied to produce the data from which curve B was drawn.

Curve C represents the permeability characteristic of a hydrogen diffusion barrier consisting of a 1.1 mil palladium foil overlaid on an approximately $3/32$ inch thick porous ceramic material. Permeation tests on this foil barrier were conducted at a temperature of 300° C. and pressure was varied to produce the data from which curve C of FIGURE 3 was drawn.

Curve D illustrates tests on the same barrier as that for curve C but conducted at a temperature of 250° C.

The slopes of the respective curves A, B, C, and D, which slopes are indicative of and proportional to the barrier permeability characteristics, are 1, 1, 0.72 and 0.67. A comparison of curves C and D illustrates the enhanced permeability achieved with a conventional foil overlaid barrier with a temperature increase from 250° C. to 300° C. Most striking, however, is a comparison of the curves A, B with curves C, D which shows an extraordinary increase in permeability, and at lower temperatures, of the vapor plated barriers over the foil overlaid barriers. While it is a fact that the vapor plating barrier coating technique gives rise to this advantageous feature in large measure, the successful plating of the extremely thin vapor plated coatings on the curve A and B barriers is directly attributable to the availability of the extremely fine microporous substrates according to the present invention. The making available of barriers of a characteristic permeability to hydrogen which varies according to the first power (i.e., slope of 1) of the hydrogen pressure over a wide range can be seen to constitute a significant advance in the art when considered in view of conventional barriers of characteristic permeabilities according to fractional powers of hydrogen pressure. The resulting increase in throughput can be seen from FIGURE 3 to be in the order of 5 to 10 times as great for hydrogen-specific diffusion barriers embodying substrates according to the present invention as for conventional one-mil palladium foil type diffusers, and this at considerably lower operating temperatures than used with conventional barrier equipment. In respect of these lower operating temperatures, additional advantages accrue, sc., plastic or other relatively inexpensive low temperature gasketing and sealing materials can be used in place of metal components; heat insulation requirements are lessened; heating costs are lowered; carbonization by-products which tend to foul the equipment are lessened and there are volumetric economies in equipment designed for lower operating temperatures.

In fabricating filters and substrates according to the present invention, apparatus similar to that shown in FIGURE 1 of the drawings has been used successfully. The particular substrates embodied in the diffusion barriers used in the tests for curves A and B of FIGURE 3 were made in this apparatus according to the following procedures:

Grade "H" porous stainless steel filter stock was used to form base pieces for the substrates and filters. Porous iron filter stock may also be used as base piece material. Nickel electrodes, $3/16$ inch in diameter were used. Voltage applied to the electrodes during arcing was 50 ±10 volts and arc current through the electrodes was maintained at 5 ±2 amperes. Ordinary commercial grade cylinder nitrogen at one atmosphere was introduced in flow through the arc chamber during the coating and a conventional water aspirator was connected to the vacuum conduit to pull nickel particles into the base piece surface. Under these conditions, it was found that from ½ to 1 hour of operation was required to deposit 0.1 to 0.2 gram of nickel on a $15/16$ inch diameter base piece, i.e., approximately 0.02 to 0.04 gram of nickel per square centimeter of area of base piece coated face.

Sintering was effected by heating the nickel coated base pieces in 1 atmosphere of hydrogen for ½ to 1 minute at a temperature of from about 760° C. to about 870° C.

Compressive force to press the nickel coated and sintered base pieces against a hardened polished tool steel or a mica surface can be from about a 6 tons per square inch minimum to about 12 tons per square inch with very good results obtaining at about 10 tons per square inch. The time of pressure applications was found to be not critical.

While, in the foregoing description, certain specific details and procedural steps have been disclosed, together with certain suggested modifications, variations may be made in these without departing from the spirit of the present invention. The foregoing description has been given for clearness of understanding only and no unnecessary limitations should be understood therefrom.

What is claimed is:

A method for making a smooth facia surface fine porosity filter element which method comprises the steps of producing finely divided solid particles of nickel in an electric arc between two nickel electrodes, directing a stream of said finely divided nickel particles to impinge on a porous metal base piece, depositing said finely divided nickel particles on said base piece until a nickel particle coating of from about 0.02 to about 0.04 gram of nickel per square centimeter of coated surface area of the base piece is achieved, sintering the deposited nickel particle coating in about one atmosphere of hydrogen for a time of from about ½ to about 1 minute at a temperature of from about 760° C. to about 870° C., and compressing the deposited sintered nickel particles and the base piece with a smooth facia compressive force of from about 6 to about 12 tons per square inch whereby said deposited sintered nickel particles are formed to a smooth facia surface having pore sizes of from about 30 to about 300 Angstroms.

References Cited by the Examiner
UNITED STATES PATENTS

| | | | |
|---|---|---|---|
| 2,824,620 | 2/1958 | De Rosset | 55—16 |
| 2,958,391 | 11/1960 | De Rosset | 55—16 |
| 2,980,532 | 4/1961 | Martensson et al. | 75—208 |

JULIUS GREENWALD, *Primary Examiner.*